(12) United States Patent
Liu et al.

(10) Patent No.: US 7,518,878 B1
(45) Date of Patent: Apr. 14, 2009

(54) COMPUTER ENCLOSURE

(75) Inventors: Chang-Chun Liu, Shenzhen (CN); Liang-Liang Qiu, Shenzhen (CN)

(73) Assignees: Hon Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/967,057

(22) Filed: Dec. 29, 2007

(30) Foreign Application Priority Data

Dec. 14, 2007  (CN) .......................... 2007 1 0203096

(51) Int. Cl.
*H05K 5/00* (2006.01)
*H05K 7/00* (2006.01)
*H05K 7/16* (2006.01)

(52) U.S. Cl. ........................ 361/726; 361/683; 361/724; 361/725

(58) Field of Classification Search ................. 361/683, 361/686, 724–727; 206/305, 320
See application file for complete search history.

(56) References Cited

U.S. PATENT DOCUMENTS

| 6,157,532 A * | 12/2000 | Cook et al. ................. 361/681 |
| 6,583,983 B1* | 6/2003 | Chen et al. .................. 361/683 |
| 7,152,443 B2* | 12/2006 | Chang et al. .................. 70/352 |
| 2006/0209501 A1* | 9/2006 | Han ........................... 361/679 |

* cited by examiner

*Primary Examiner*—Jayprakash N Gandhi
*Assistant Examiner*—Anthony M Haughton
(74) *Attorney, Agent, or Firm*—Frank R. Niranjan

(57) ABSTRACT

A computer enclosure includes a chassis, a side plate, and a securing member. The chassis includes a rear plate defining a sliding groove therein. The side plate is attached to a side of the chassis. At least one fixing post extends perpendicularly from an inner surface of the side plate located near a rear side. The securing member is movably mounted in the sliding groove. The securing member includes an operating portion exposed outside of the chassis through the sliding groove, and a clamping portion located in the chassis. When the securing member is moved along the sliding groove, the clamping portion is moved with the securing member to engage with or disengage from the at least one fixing post of the side plate. Thus, the side plate is attached to or removed from the chassis.

18 Claims, 3 Drawing Sheets

COMPUTER ENCLOSURE

BACKGROUND

1. Field of the Invention

The present invention relates to computer enclosures, and especially to a computer enclosure for securely fixing side plates to a chassis of the computer enclosure.

2. Description of Related Art

A personal computer enclosure accommodates a number of electronic devices therein. The computer enclosure may need to be opened sometimes for a variety of reasons, such as for replacing a defective electronic device. Therefore, the computer enclosure should be able to be readily opened and subsequently reassembled.

Conventionally, a computer enclosure includes a base, a pair of side plates, and a top plate. Bolts are used to secure the side plates and the top plate to the base. However, attachment by bolts is tiresome and time-consuming.

To address the aforementioned problem, a computer enclosure not requiring the use of bolts includes a base, a pair of side plates, and a top plate. The side plates and the top plate are respectively secured to the base of the enclosure with separate securing elements. A plurality of locking slots is defined in the base. A plurality of locking tabs is formed on the side plates and the top plate, for engagement in the locking slots of the base to fix the side plates and the top plate to the base. However, the locking tabs and the corresponding locking slots easily come apart.

What is desired, therefore, is a computer enclosure with convenient easily secured side plates.

SUMMARY

An exemplary computer enclosure includes a chassis, a side plate, and a securing member. The chassis includes a rear plate defining a sliding groove therein. The side plate is attached to a side of the chassis, at least one fixing post extending perpendicularly from an inner surface of the side plate located near a rear side thereof. The securing member is movably mounted in the sliding groove. The securing member includes an operating portion exposed outside of the chassis through the sliding groove, and a clamping portion located in the chassis. When the securing member is moved along the sliding groove, the clamping portion is moved with the securing member to engage with or disengage from the at least one fixing post of the side plate. Thus, the side plate is attached to or removed from the chassis.

Other advantages and novel features will become more apparent from the following detailed description when taken in conjunction with the accompanying drawings, in which:

DETAILED DESCRIPTION

Figure 1:
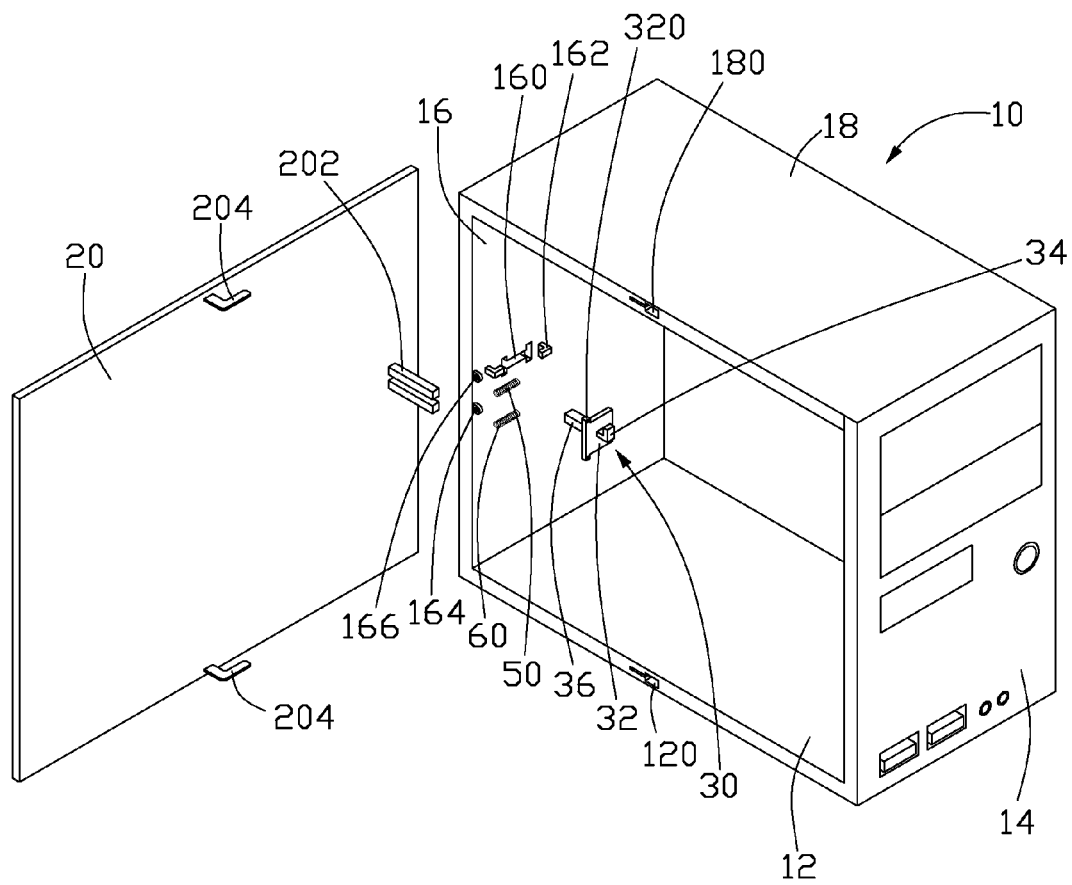
FIG. 1 is an exploded, isometric view of a computer enclosure in accordance with a preferred embodiment of the present invention.

Referring to FIG. 1, a computer enclosure in accordance with an embodiment of the present invention includes a chassis 10, a side plate 20, a securing member 30 for fixing the side plate 20 to the chassis 10, and two resilient members such as springs 50, 60.

The chassis 10 includes a bottom plate 12 defining a T-shaped hole 120 in a middle of one side surface thereof, a front plate 14, a rear plate 16, and a top plate 18 defining a T-shaped hole 180 corresponding to the hole 120. The bottom plate 12, the front plate 14, the rear plate 16, and the top plate 18 cooperate to bound a receiving space. A size of a first part of each of the holes 120, 180 neighboring the front plate 14 is greater than the opposite second part of each of the holes 120, 180 near the rear plate 16. The rear plate 16 defines a sliding groove 160 therein near a side thereof. Two L-shaped positioning blocks 162 extend from the rear plate 16 at opposite ends of the sliding groove 160. Each positioning block 162 includes an extending portion extending perpendicularly from the rear plate 16, and a bent portion parallel to the rear plate 16. Two tabs 164 each defining a fixing hole 166 respectively extend from the rear plate 16 between an edge of the rear plate 16 and one of the positioning block 162.

Two fixing posts 202 perpendicularly extend from an inner surface of the side plate 20 neighboring a rear end thereof. Two L-shaped latching hooks 204 respectively extend from an upper side and a lower side of the side plate 20. Each hook 204 extends perpendicularly from the inner surface of the side plate 20, and then bends towards the rear end of the side plate 20.

The securing member 30 includes a main body 32, an L-shaped clamping portion 34 extending from a surface of the main body 32, and an operating portion 36 extending from an opposite surface of the main body 32. Two fixing blocks 320 each defining a hole therein (shown in FIG. 3) respectively extend from opposite ends of a same side of the main body 32. The clamping portion 34 includes a fixing end extending from the corresponding surface of the main body 32, and a free end bent upward from the fixing end.

Figure 2:
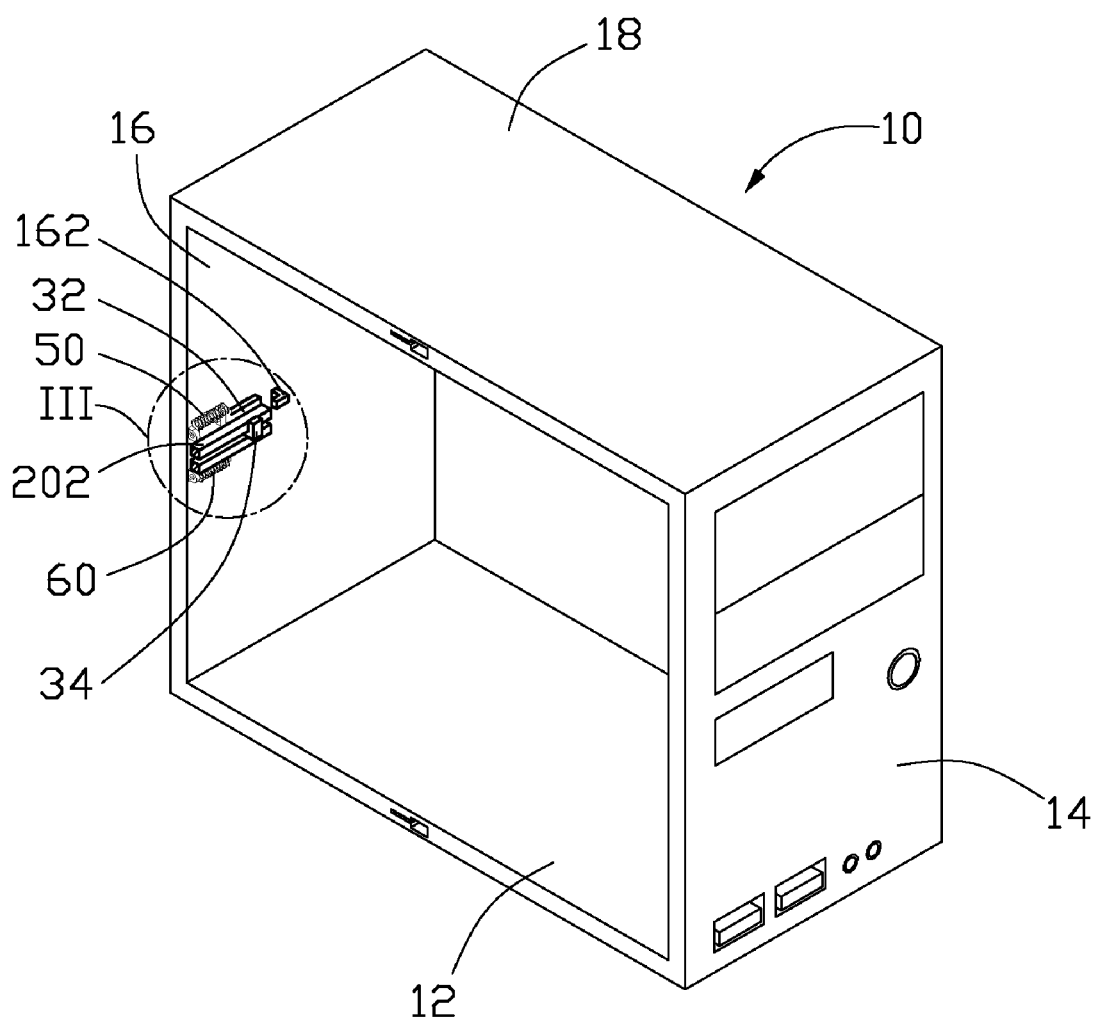
FIG. 2 is a partially assembled view of FIG. 1.
Figure 3:
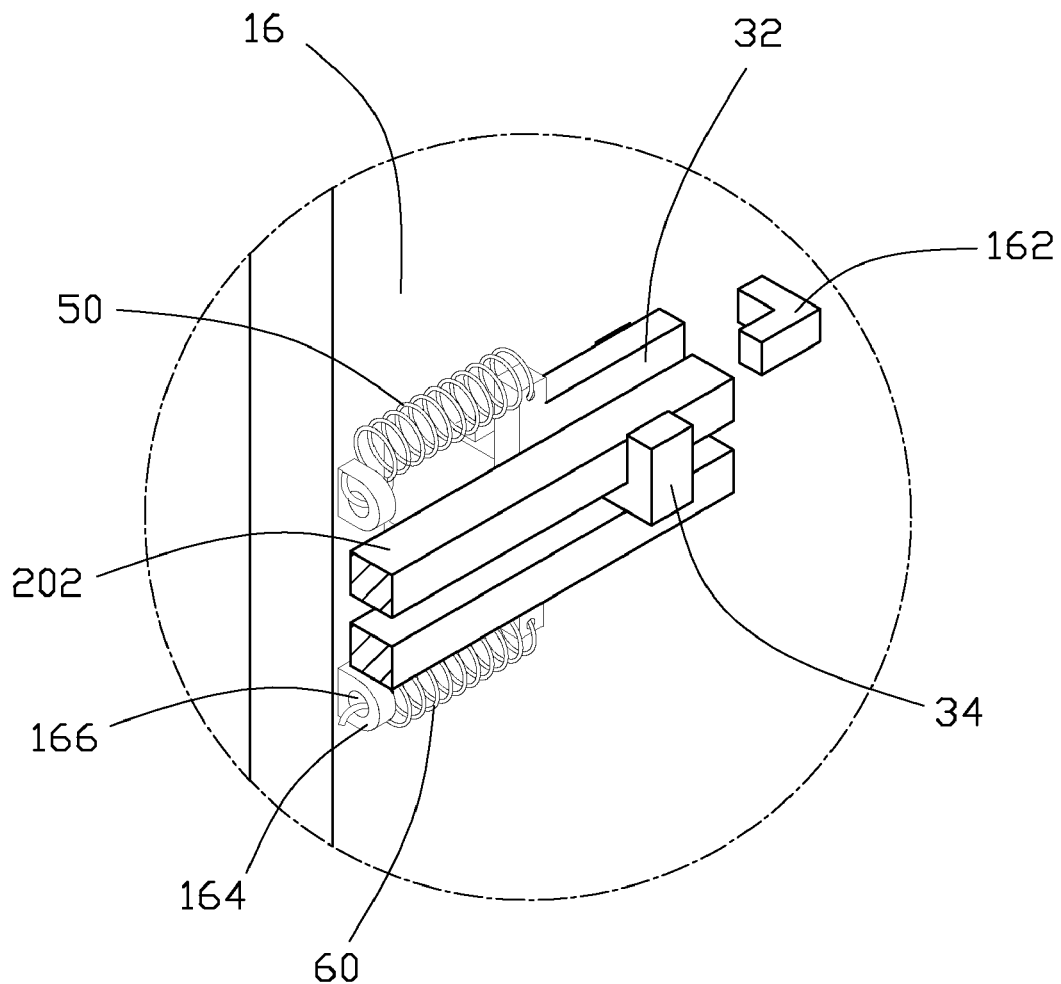
FIG. 3 is an enlarged view of a circled portion III of FIG. 2.

Referring to FIG. 2 and FIG. 3, in assembly, the operating portion 36 of the securing member 30 is passed through the sliding groove 160 of the rear plate 16 from the receiving space side of the rear plate 16. An end of each of the first spring 50 and the second spring 60 is fixed to the fixing hole 164 of a corresponding tab 166, and the other end of each of the first spring 50 and the second spring 60 is fixed to the hole of the corresponding fixing block 320 of the securing member 30. When the first and second springs 50, 60 are in an original state, a corresponding side of the main body 32 of the securing member 30 is resisted by the extending portion of the positioning block 162 neighboring the tabs 164, and the securing member 30 is located in a first position. The side plate 20 is attached to the chassis 10. The two latching hooks 204 of the side plate 20 are respectively passed into the first parts of the holes 120, 180. The operating portion 36 is moved along the sliding groove 160 to make the securing member 30 depart away from the tabs 164, until the side away from the tabs 164, of the securing member 30 is resisted by the positioning block 162 located away from the tabs 164, and then the first spring 50 and the second spring 60 are stretched. The side plate 20 is moved rearward, with the latching hooks 204 thereof respectively moving along the holes 120, 180 to engage in the second parts of the holes 120, 180. The operating portion 36 is released, and the first spring 50 and the second spring 60 are restored to urge the securing member 30 to move back to the first position. The clamping portion 34 of the securing member 30 moves between the fixing posts 202 and is restricted by the fixing posts of the side plate 20.

To detach the side plate 20, the operating portion 36 is moved along the sliding groove 160 way from the tabs 164, until one side of the securing member 30 is resisted by the positioning block 162 located away from the tabs 164. The clamping portion 34 of the securing member 30 moves away from the fixing posts 202 and is disengaged from the fixing posts 202 of the side plate 20. Thus the side plate 20 is easily detached from the chassis 10. The operating portion 36 is released, and the securing member 30 is moved to the first position by the first and the second springs 50, 60.

In other embodiments, The resilient members can be omitted, and the sliding groove 160 defined in the rear plate 16 is H-shaped. The operating portion 36 of the securing member 30 is moved along the sliding groove 160, and the operating portion 36 can be moved down and engaged in a lower portion of the sliding groove 160.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A computer enclosure comprising:
   a chassis comprising a bottom plate, a front plate and a rear plate extending up from a front side and a rear side of the bottom plate, and a top plate coupled to tops of the front plate and the rear plate, the rear plate defining a sliding groove therein, an open side is cooperatively defined by edges of the bottom, front, first, and top plates;
   a side plate for being movable along the open side of the chassis toward the rear plate, at least one fixing post extending perpendicularly from an inner surface of the side plate, and said at least one fixing post located near a rear side of the side plate;
   a securing member movably mounted in the sliding groove of the chassis, the securing member comprising a main body abutting against an inner surface of the rear plate, an operating portion extending from the main body and exposed outside of the chassis through the sliding groove, and a clamping portion located in the chassis, the clamping portion comprising a fixing end extending from the main body and a free end perpendicularly bent from the fixing end;
   wherein when the operating portion is transversely moved towards the open side along the sliding groove, together with the clamping portion, a side-surface of the main body and the free end move perpendicular to the open side and clamp said at least one fixing post of the side plate.

2. The computer enclosure as claimed in claim 1, wherein side surfaces of the top plate and the bottom plate respectively define a hole therein, two latching hooks respectively extend from an upper side and a lower side of the inner surface of the side plate, and the latching hooks are respectively movably engaged in the corresponding holes of the top and bottom plates.

3. The computer enclosure as claimed in claim 1, wherein the sliding groove is H-shaped, the operating portion is capable of being engaged in a lower portion of the sliding groove, for positioning the securing member.

4. The computer enclosure as claimed in claim 1, wherein the two positioning blocks extend from the rear plate, the securing member is movable between the positioning blocks each restricting a corresponding side of the securing member.

5. The computer enclosure as claimed in claim 4, wherein each of the positioning blocks is L-shaped and comprises an extending portion perpendicularly extending from the rear plate and a bending portion extending from a free end of the extending portion and parallel to the rear plate.

6. The computer enclosure as claimed in claim 1, wherein the clamping portion is L-shaped; the at least one fixing post comprises two parallel fixing posts perpendicularly extending from the inner surface of the side plate; the fixing end is sandwiched between the two fixing posts, and one of the fixing posts supports the fixing end.

7. The computer enclosure as claimed in claim 1, further comprising at least one resilient member, wherein the resilient member is connected between the rear plate of the chassis and the securing member, for urging the securing member to return to an original place thereof.

8. The computer enclosure as claimed in claim 7, wherein the securing member further comprises at least one fixing block defining a hole therein, at least one tab defining a fixing hole therein extends from the rear plate, one end of the spring is engaged in the fixing hole of said at least one tab, and the other end of the spring is engaged in the hole of said at least one fixing block.

9. A computer enclosure comprising:
   a chassis comprising a bottom plate, a front plate and a rear plate extending up from a front side and a rear side of the bottom plate, and a top plate coupled to tops of the front plate and the rear plate, the rear plate defining a sliding groove therein;
   a side plate for being attached to an open side of the chassis defined by the bottom, front, rear, and top plates, the side plate being movable in a direction from the front plate to the rear plate to cover the open side, and in a direction from the rear plate to the front plate to uncover the open side, two parallel fixing posts extending perpendicularly from a rear side of the side plate; and
   a securing member movably mounted in the sliding groove of the chassis, the securing member comprising an operating portion and a clamping portion opposite to the operating portion, the clamping portion comprising a fixing end and a free end perpendicularly bent from the fixing end;
   wherein when the side plate is covering the open side, the fixing end is moved toward the open side to be sandwiched between the two fixing posts, and a first of the fixing posts is supported by the fixing end and abutting against the free end to prevent the side plate from moving away from the rear plate.

10. The computer enclosure as claimed in claim 9, wherein the securing member further comprises a main body, the operating portion extends from a surface of the main body, the clamping portion extends from an opposite surface of the main body.

11. The computer enclosure as claimed in claim 10, wherein the fixing end extends from the main body, the first of the fixing post is sandwiched between side-surfaces of the main body and the free end.

12. The computer enclosure as claimed in claim 9, wherein the sliding groove is H-shaped, the operating portion moves transversely toward the open side along the sliding groove, and capable of being engaged in a lower portion of the sliding groove, for positioning the securing member.

13. The computer enclosure as claimed in claim 9, two positioning blocks extend from the rear plate, the securing member is movable between the positioning blocks, and each positioned block restricts a corresponding side of the securing member.

14. The computer enclosure as claimed in claim 9, further comprising at least one resilient member connected between the rear plate of the chassis and the securing member, for urging the securing member to return to an original place thereof.

15. The computer enclosure as claimed in claim 14, wherein the securing member further comprises at least one fixing block defining a hole therein; at least one tab extending from the rear plate and defining a fixing hole therein; a first end of the spring is engaged in the fixing hole of said at least one tab, and an opposite second end of the spring is engaged in the hole of said at least one fixing block.

16. A computer enclosure comprising:
- a computer chassis comprising a first plate, and an open side perpendicular to the first plate and defining an opening for accessing electronic components in the computer chassis;
- a side plate movable along the open side toward the first plate to shield the opening, a fixing post extending perpendicularly from the side plate, and abutting the first plate when the side plate shields the opening;
- a sliding groove defined in the first plate and perpendicular to the open side; and
- a securing member movable along the sliding groove between a locking position in which an L-shaped clamping portion of the securing member is moved toward the open side to block the fixing post from moving back, and a release position in which the clamping portion is moved away from the open side to release the fixing post.

17. The computer enclosure as claimed in claim 16, further comprising a resilient element connected between the first plate and the securing member, and configured for driving the securing member toward the open side.

18. The computer enclosure as claimed in claim 17, wherein the sliding groove has a stepped lower distal end away from the open side, to retain the securing member therein in the release position and resist a restoring force of the resilient element.

* * * * *